US007649895B2

(12) United States Patent
Kadar et al.

(10) Patent No.: US 7,649,895 B2
(45) Date of Patent: Jan. 19, 2010

(54) APPARATUS AND METHOD FOR ROUTING MULTIMEDIA MESSAGES BETWEEN A USER AGENT AND MULTIPLE MULTIMEDIA MESSAGE SERVICE CENTERS

(75) Inventors: Vincent Kadar, Dunrobin (CA); Jiwei Wang, Kanata (CA); Ken Kim, Kanata (CA); David Featherstone, Kanata (CA)

(73) Assignee: Airwide Solutions Inc., Reading (GB)

( * ) Notice: Subject to any disclaimer, the term of this patent is extended or adjusted under 35 U.S.C. 154(b) by 1056 days.

(21) Appl. No.: 10/747,366

(22) Filed: Dec. 30, 2003

(65) Prior Publication Data

US 2005/0141522 A1 Jun. 30, 2005

(51) Int. Cl.
*H04L 12/28* (2006.01)

(52) U.S. Cl. .................. 370/396; 370/310; 370/313; 370/402; 370/496; 709/200; 709/206; 709/223; 709/249; 455/412; 455/414.1; 455/466

(58) Field of Classification Search ................ 370/310, 370/312, 313, 400, 401, 402, 487, 496, 535; 709/200, 206, 217, 223, 230, 249; 455/412, 455/414.1, 406, 466
See application file for complete search history.

(56) References Cited

U.S. PATENT DOCUMENTS

| 6,848,008 | B1 * | 1/2005 | Sevanto et al. ............... 709/249 |
| 7,106,718 | B2 * | 9/2006 | Oyama et al. ................ 370/340 |
| 7,133,420 | B2 * | 11/2006 | Chang et al. ................. 370/496 |
| 7,154,901 | B2 * | 12/2006 | Chava et al. ................. 370/401 |
| 7,181,538 | B2 * | 2/2007 | Tam et al. .................... 709/246 |
| 7,430,284 | B2 * | 9/2008 | Dudley et al. ............ 379/88.13 |
| 7,457,865 | B2 * | 11/2008 | Ramakrishnan et al. ..... 709/224 |
| 7,526,271 | B2 * | 4/2009 | Tang et al. ................... 455/406 |

2001/0039589 A1 * 11/2001 Aho et al. .................... 709/230

(Continued)

FOREIGN PATENT DOCUMENTS

CA 2320690 3/2001

(Continued)

OTHER PUBLICATIONS

"Multimedia Messaging Service: Service Aspects; Stage 1", 3rd Generation Partnership Project, TS 22.140 Release 5, Dec. 2002, pp. 1-14.

(Continued)

*Primary Examiner*—Ayaz R Sheikh
*Assistant Examiner*—Andrew C Lee
(74) *Attorney, Agent, or Firm*—Shalom Wertsberger; Saltamar Innovations

(57) ABSTRACT

An apparatus and a method for routing a multimedia message sent by a user agent to one of a plurality of multimedia message service centers, the user agent applying a pre-determined determined destination address to the multimedia message. The multimedia message is received at the pre-determined destination address, a target multimedia message service center is selected and the multimedia message is forwarded to the target multimedia message service center. Routing is based on address information contained in the multimedia message, session identification information associated with the multimedia message, load-balancing and fault-tolerance information associated with each one of the plurality of multimedia message service centers, service identifying information contained in the multimedia message and combinations thereof.

4 Claims, 9 Drawing Sheets

U.S. PATENT DOCUMENTS

| | | | |
|---|---|---|---|
| 2001/0049745 A1* | 12/2001 | Schoeffler | 709/238 |
| 2002/0078228 A1* | 6/2002 | Kuisma et al. | 709/237 |
| 2002/0087549 A1* | 7/2002 | Mostafa | 707/10 |
| 2002/0126708 A1* | 9/2002 | Skog et al. | 370/522 |
| 2003/0105825 A1* | 6/2003 | Kring et al. | 709/206 |
| 2003/0154300 A1* | 8/2003 | Mostafa | 709/231 |
| 2003/0158902 A1* | 8/2003 | Volach | 709/206 |
| 2004/0039789 A1* | 2/2004 | Jackson et al. | 709/217 |
| 2004/0047452 A1* | 3/2004 | Su et al. | 379/88.13 |
| 2004/0068574 A1* | 4/2004 | Costa Requena et al. | 709/230 |
| 2004/0092250 A1* | 5/2004 | Valloppillil | 455/412.1 |
| 2004/0111476 A1* | 6/2004 | Trossen et al. | 709/206 |
| 2004/0148400 A1* | 7/2004 | Mostafa | 709/227 |
| 2004/0156495 A1* | 8/2004 | Chava et al. | 379/392 |
| 2004/0185883 A1* | 9/2004 | Rukman | 455/466 |
| 2004/0215526 A1* | 10/2004 | Luo et al. | 705/26 |
| 2004/0258063 A1* | 12/2004 | Raith et al. | 370/389 |
| 2004/0259531 A1* | 12/2004 | Wood et al. | 455/412.1 |
| 2005/0004968 A1* | 1/2005 | Mononen et al. | 709/200 |
| 2005/0108417 A1* | 5/2005 | Haumont | 709/232 |
| 2005/0259652 A1* | 11/2005 | Tang et al. | 370/389 |
| 2006/0109836 A1* | 5/2006 | Goertz et al. | 370/352 |

FOREIGN PATENT DOCUMENTS

| | | |
|---|---|---|
| EP | 1 501 249 | 1/2005 |
| WO | WO 02/058356 | 7/2002 |
| WO | WO 03/049461 | 6/2003 |
| WO | WO 03/058991 | 7/2003 |
| WO | WO 03/103309 | 12/2003 |

OTHER PUBLICATIONS

Multimedia Messaging Service: Functional Description; Stage 2, 3rd Generation Partnership Project, TS 23.140 Release 5, Jun. 2003, pp. 1-157.

"Multimedia Messaging Service: Architecture Overview", Version 1.1 (Nov. 1, 2002), Open Mobile Alliance, OMA-WAP-MMS-ARCH-v1_1-20021101-C, pp. 1-26.

"Multimedia Messaging Service: Client Transactions", Version 1.1 (Oct. 31, 2002), Open Mobile Alliance, OMA-WAP-MMS-CTR-v1_1-20021031-C, pp. 1-55.

"Multimedia Messaging Service: Encapsulation Protocol", Version 1.1 (Oct. 30, 2002), Open Mobile Alliance, OMA-MMS-ENC-v1_1-20021030-C, pp. 1-67.

* cited by examiner

APPARATUS AND METHOD FOR ROUTING MULTIMEDIA MESSAGES BETWEEN A USER AGENT AND MULTIPLE MULTIMEDIA MESSAGE SERVICE CENTERS

FIELD OF INVENTION

The present invention relates to the field of multimedia messaging services. In particular, to an apparatus and a method for mediating (routing) messages between a multimedia messaging service user agent and multiple multimedia message service centers.

BACKGROUND

Wireless (cellular) networks such as those implementing, for example, General Packet Radio Service (GPRS), Code Division Multiple Access (CDMA)-One, CDMA-2000 and W-CDMA support multimedia messaging service (MMS) in addition to voice and text messaging. Multimedia messaging can take the form of person-to-person (P2P) messaging and application-to-person (or person-to-application) (A2P) messaging. In P2P messaging, messages are sent from one user agent (UA) on a wireless network user's terminal (e.g. a MMS smart phone) to another UA on a second user's terminal and vice versa via a multimedia messaging service center (MMSC). A2P messaging involves messages being sent, via a MMSC, between a UA on a wireless network user's terminal and an application on an application server.

FIG. 1 represents a MMS reference model according to the 3rd Generation Partnership Project TS 23.140 technical specification. The technical specification provides for a protocol, known as MM1, between a user agent (e.g. MMS User Agent A and MMS User Agent B) and a MMSC (e.g. MMS Relay/Server). Another protocol, known as MM4, is provided between pairs of MMSC such as between MMS Relay/Server and "Foreign" MMS Relay/Server.

FIG. 2 represents a schematic diagram of the relationship between a UA 110 and a MMSC 120 in the context of additional entities, a WAP Gateway 130, a WAP Push Proxy 150, a Short Message Service Center (SMSC) 140 and an Application Server 160, that are commonly part of a conventional GPRS or a third generation (3G) wireless network.

A link between the UA 110 and the WAP Gateway 130 supports Wireless Applications Protocol (WAP). A link between the WAP Gateway 130 and the MMSC 120 supports the MM1 protocol. A link between the UA 110 and the SMSC 140 supports the Signal System No. 7 (SS7) protocol. The WAP Push Proxy 150 has a link to the MMSC 120 that supports the Push Proxy Protocol (PAP) (WAP Forun, WAP-247-PAP-20010429-a, "Push Access Protocol") and a link to the SMSC 140 that supports the Short Message Peer to Peer (SMPP) protocol or other similar protocol such as, for example, Computer Interface to Message Distribution (CIMD), Universal Computer Protocol/External Machine Interface (UCP/EMI) and China Mobile Peer to Peer (CMPP). For the purposes of exchanging MMS messages between the UA 110 and the MMSC 120, the presence to the WAP Push Proxy 150 is effectively transparent.

Note that some of the above named protocols are hierarchical and therefore messages according one protocol can be encapsulated and transported within messages according to another protocol.

FIG. 3 represents a message sequence chart for a number of exemplary MM1 message sequences showing the flow of messages between the UA 100 (MMS UA), the SMSC 140, the WAP Gateway (WAP G/W) 130 and the MMSC 120 as represented in FIG. 2. Note that all unsolicited messages originating from the UA 110 are sent to the WAP Gateway 130 where they are forwarded onto the MMSC 120. Messages originating from the MMSC 120 in response to a message from the UA 110 are sent to the WAP Gateway 130 where they are forwarded onto the UA 110. Unsolicited messages originating from the MMSC 120 are sent to SMSC 140 where they are forwarded onto the UA 110.

Wireless networks can have multiple MMSC 120 for various reasons including, for example, multiple service offerings or service types (e.g. P2P, A2P and MMStore), enhanced performance (e.g. load-balancing), use of multiple MMSC vendors' equipment, server redundancy, geographic dispersion and other similar reasons. Most UA are typically configured with an address, in the form of a universal resource locator (URL), of one MMSC 120. This address is used whenever the UA 110 initiates communication with (i.e. sends a message to) the MMSC 120. In the presence of multiple MMSC there is a problem addressing each individual MMSC 120. The provisioning of a single MMSC 120 address in the UA 110 creates difficulties in exploiting the benefits or multiple MMSC 120 in the network since the multiple MMSC 120 can not be directly addressed by the UA 110. In addition, when an MMSC 120 initiates communication with the UA 110, the messages are typically sent via SMSC 140 and the messages do not always contain the address of the MMSC 120. When responding to messages initiated by the MMSC 120, the UA 110 will always uses the MMSC 120 address with which it is configured. What is needed is a mechanism that provides for a UA to access a range of services provided by a plurality of MMSC 120 while using only a single MMSC 120 address.

SUMMARY OF INVENTION

An apparatus and a method for routing a multimedia message sent by a user agent to one of a plurality of multimedia message service centers, the user agent applying a pre-determined destination address to the multimedia message. The multimedia message is received at the pre-determined destination address, a target multimedia message service center is selected and the multimedia message is forwarded to the target multimedia message service center. Routing is based on address information contained in the multimedia message, session identification information associated with the multimedia message, load-balancing and fault-tolerance information associated with each one of the plurality of multimedia message service centers, service identifying information contained in the multimedia message and combinations thereof.

In accordance with one aspect of the present invention, a router, comprising: (a) a first server interface for receiving a multimedia message, sent from a user agent, based on a predetermined destination address; (b) a message routing mechanism for: (i) selecting a target multimedia message service center, having an address, from a plurality of multimedia message service centers; and (ii) applying the address to the multimedia message received by the first server interface; and (c) a first client interface for forwarding the multimedia message to the applied address.

In accordance with another aspect of the present invention, a method for routing a multimedia message sent by a user agent to one of a plurality of multimedia message service centers, the user agent applying a pre-determined destination address to the multimedia message, comprising the steps of: a) receiving the multimedia message, at the pre-determined destination address; b) selecting a target multimedia message service center from the plurality of multimedia message service centers; c) applying an address of the target multimedia message service center to the received multimedia message; and d) forwarding the received multimedia message responsive to the applied address of the target multimedia message service center.

In accordance with still another aspect of the present invention, a computer program product for routing a multimedia message sent by a user agent to one of a plurality of multimedia message service centers, the user agent applying a pre-determined destination address to the multimedia message, the computer program product comprising: computer readable program code devices for: a) receiving the multimedia message, at the pre-determined destination address; b) selecting a target multimedia message service center from the plurality of multimedia message service centers; c) applying an address of the target multimedia message service center to the received multimedia message; and d) forwarding the received multimedia message responsive to the applied address of the target multimedia message service center.

Other aspects and features of the present invention will become apparent to those ordinarily skilled in the art upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

Figure 4:
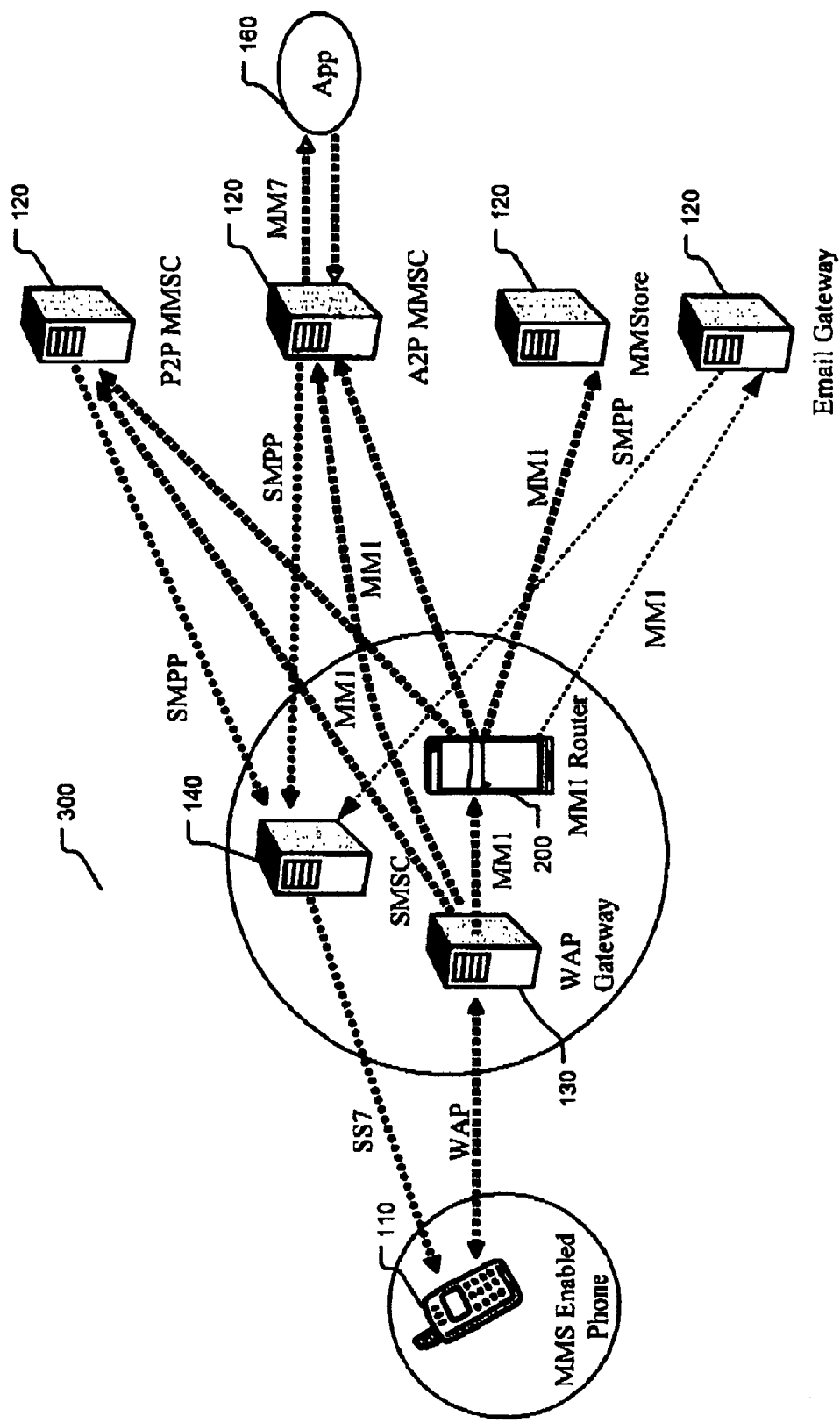
FIG. 4 is a schematic representation of an exemplary embodiment of an MM1 Router according to the present invention in an exemplary operating environment.

FIG. 4 is a schematic representation of an exemplary embodiment of an MM1 Router 200 according to the present invention in an exemplary operating environment 300. The operating environment 300 includes a UA 110 connected to a WAP Gateway 130 via the WAP protocol and to a SMSC 140 via the SS7 protocol. The WAP Gateway 130 is connected to the MM1 Router 200 via the MM1 protocol. The MM1 Router in turn is connected to each of four exemplary MMSC (P2P MMSC, A2P MMSC, Email Gateway MMSC, MMStore MMSC) 120 via the MM1 protocol. An Email Gateway MMSC 120 is responsible for routing MMS messages to external MMSC or email gateways (not shown). A MMStore MMSC 120 is responsible for providing a long term MMS message storage service. Each one of the four MMSC 120 is connected to the SMSC 140 via, for example, SMPP, CIMD, CMPP or other similar protocol. In the above description and throughout this disclosure 'connected to' is to be read as equivalent to 'in messaging communications with' and reference to connections via a named protocol is to be read as using the messaging semantic and syntax as defined by the named protocol. Note that some of the named protocols are hierarchical and therefore messages according one protocol can be encapsulated and transported within messages according to another protocol.

Note that the use of four MMSC 120 in the above embodiment is exemplary. Any number, one or more, of MMSC 120 can be used in conjunction with the present invention. Each MMSC 120 can provide either a single service or multiple services while still being usable in conjunction with the present invention.

When sending a MMS message, the UA 110 is configured to use, as a destination address (e.g. a URL), the address of the MM1 Router 200. MMS messages originating from the UA 110 are processed through the WAP Gateway 130 and arrive at the MM1 Router 200 in the form of MM1 messages. The MM1 Router 200 mediates (routes the messages) by determining, for each of the received MM1 messages, to which one of the four MMSC 120 to route the message. There are numerous factors that can influence the determination of a correct destination MMSC 120. Amongst the factors are: specific addressing information contained in a message, the need to route all messages associated with a given session to a MMSC 120 participating in the session, the desire to distribute or redirect message traffic based on load-balancing and fault-tolerance considerations, and the need to direct a message for a given service to a MMSC 120 that provides that service.

Figure 1:
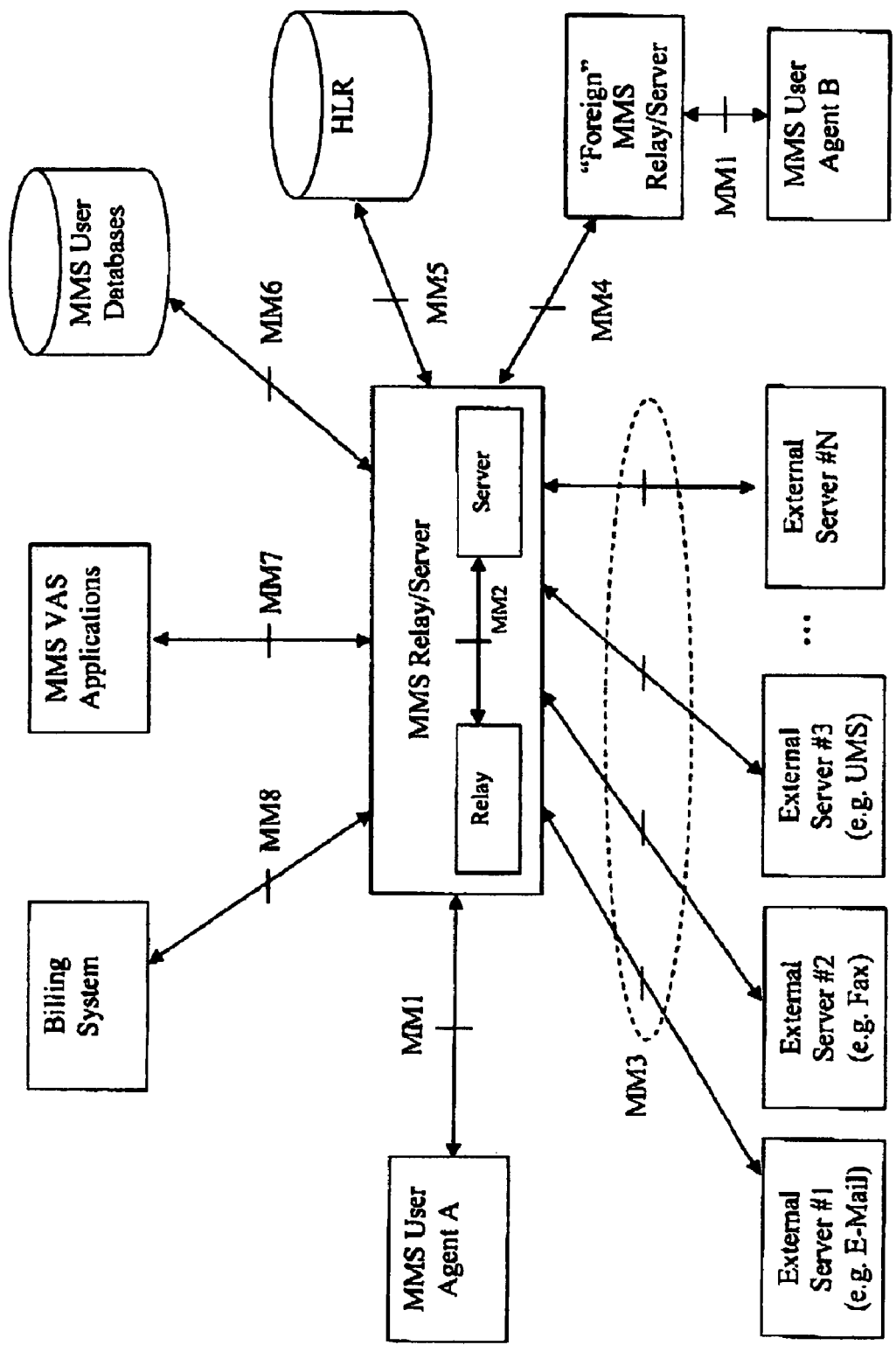
FIG. 1 represents a MMS reference model according to the 3rd Generation Partnership Project TS 23.140 technical specification.
Figure 2:
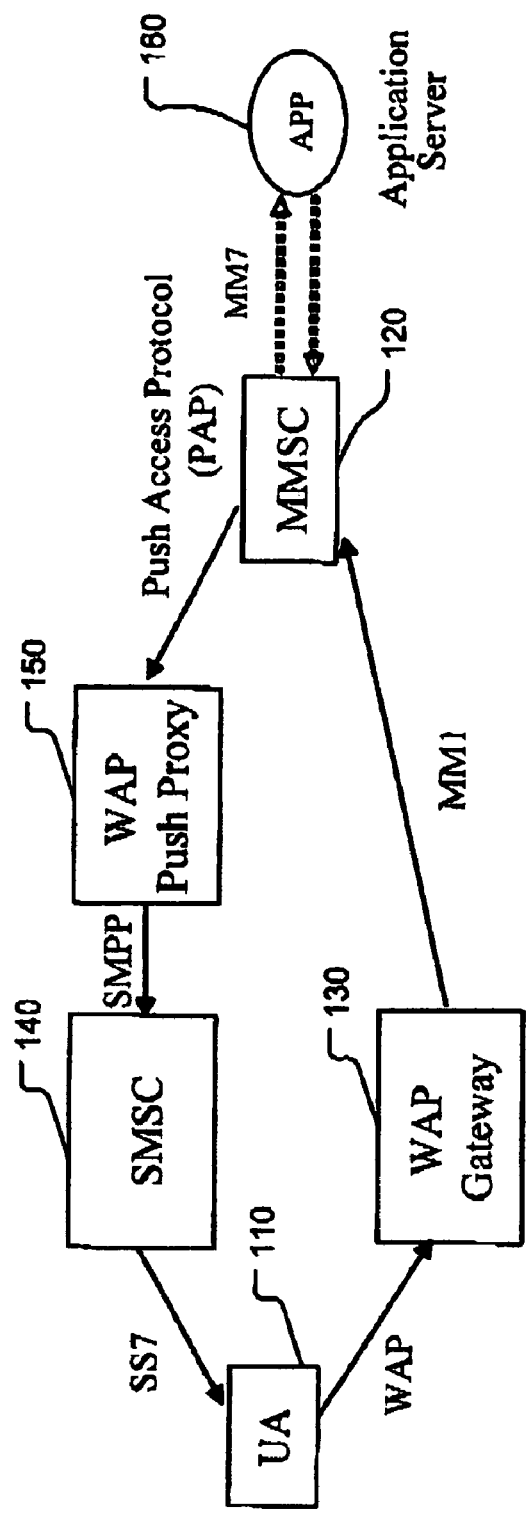
FIG. 2 represents a schematic diagram of the relationship between a UA and a MMSC in the context of additional entities that are commonly part f a conventional GPRS or a third generation (3G) wireless network.
Figure 3:
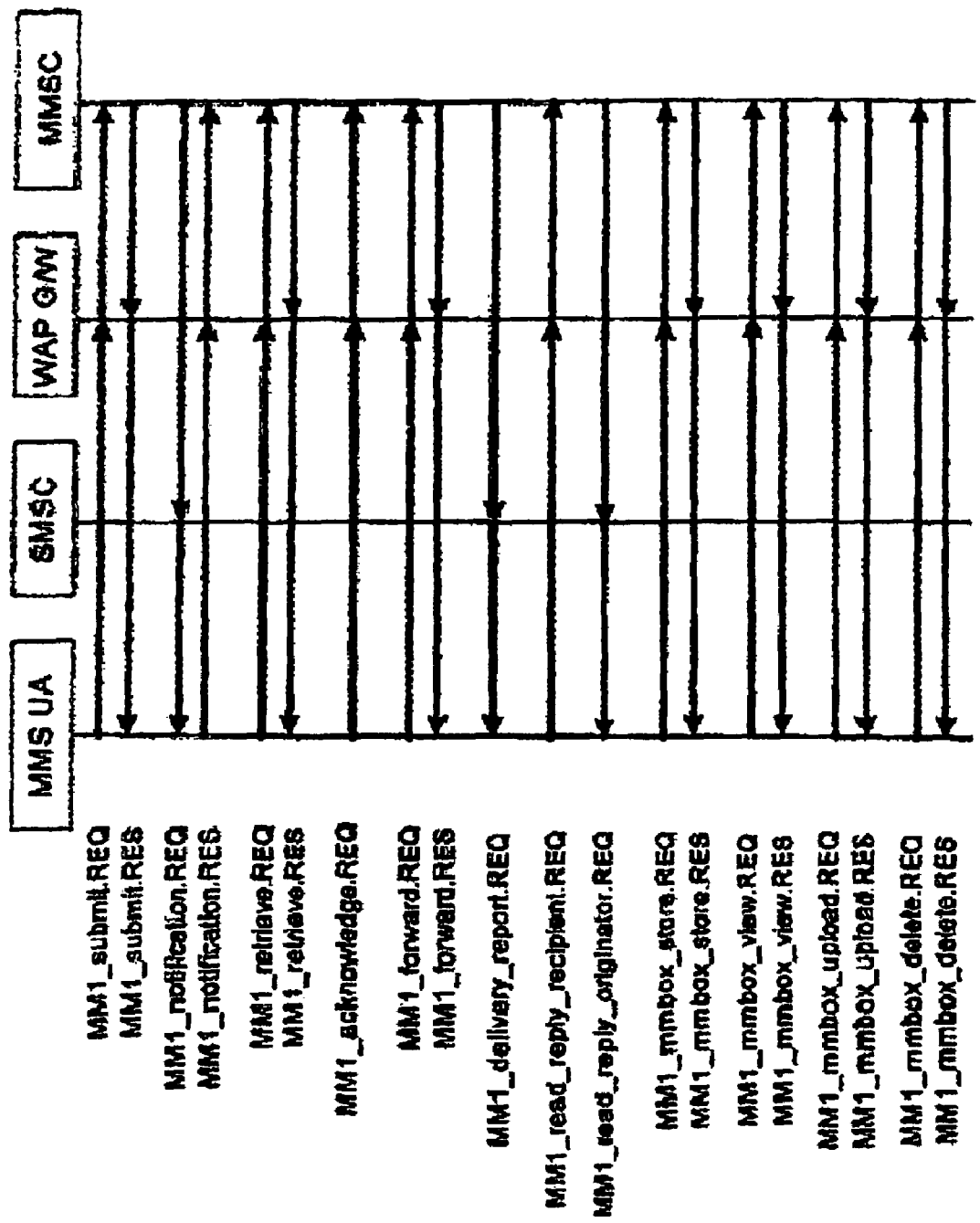
FIG. 3 represents a message sequence chart for a number of exemplary MM1 message sequences.

In an exemplary embodiment of the MM1 Router 200 according to the present invention, address based routing is provided. An address contained in an MM1 message can take the form of, for example, a RFC2822 address (according to the World Wide Web Consortium (W3C) RFC2822: Standard for ARPA Internet Text Messages), or a public land mobile network (PLMN) address, a Mobile Station Integrated Services Digital Network Number (MSISDN) or a shortcode (a service provider specific address such as, for example, a string of alphanumeric characters). The determination of which MMSC 120 to direct a received MM1 message to (i.e. the routing of the message) can be based on a destination address type (e.g. RFC2822 address, or PLMN address or shortcode), or destination address domain (e.g. a country or an area code in a PLMN address, or a domain name in an RFC2822 address). Alternatively the routing of the message can be based on a shortcode in combination with a PLMN address contained in the message. In another alternative, routing of the message can be based on a country or area code in combinations with a PLMN address contained in the message. In a further alternative, routing of the message can be based on a sender group which is derived from the message sender's PLMN address by, for example, using a country or an area code. Each of a plurality of sender groups can be assigned to a specific MMSC 120. In yet another alternative, the receiver's address can be an alias, for example, a portable phone number or a name of an application (e.g. Stock@providerA.com) which can be translated to a regular address such as, for example, any of the forms of address described above. Routing of a message containing a receiver address in alias form can, after translating the alias to another form of address, be based on the corresponding above describe method. In another exemplary embodiment of the MM1 Router 200 according to the present invention, session based routing is provided. Referring now to FIG. 3, a number of the message interactions in the MM1 protocol occur in a session context where the UA 110 originates a message to the MMSC 120 to which the MMCS 120 responds with another message and vise versa. In an exemplary operating environment 300, such as that of FIG. 4 in which there are multiple MMSC 120, all of the messages originating from the UA 110 in the context of a single session must be routed to a MMSC 120, from the multiple MMSC 120, that is involved in the session. Some of the messages, originating from the MMSC 120 to the UA 110, that initiate a session (e.g. MM1_notification.REQ, MM1_delivery_report.REQ and MM1_read_reply_originator.REQ) do not pass through the MM1 Router 200. According to the conventional MMS protocol, when a response message sent from the UA 110 such as, for example, MM1_notification.RES, MM1_read_reply_recipient.REQ or MM1_acknowledge.REQ is received by the MM1 Router it would not normally be aware of the session context of the message. In accordance with the present invention a unique discriminator is incorporated in to a transaction identifier or a message identifier of the message. The discriminator typically identifies a specific MMSC 120. The MM1 Router 200 routes the response message to an appropriate MMSC 120 based on the discriminator contained in the response message.

Figure 8:
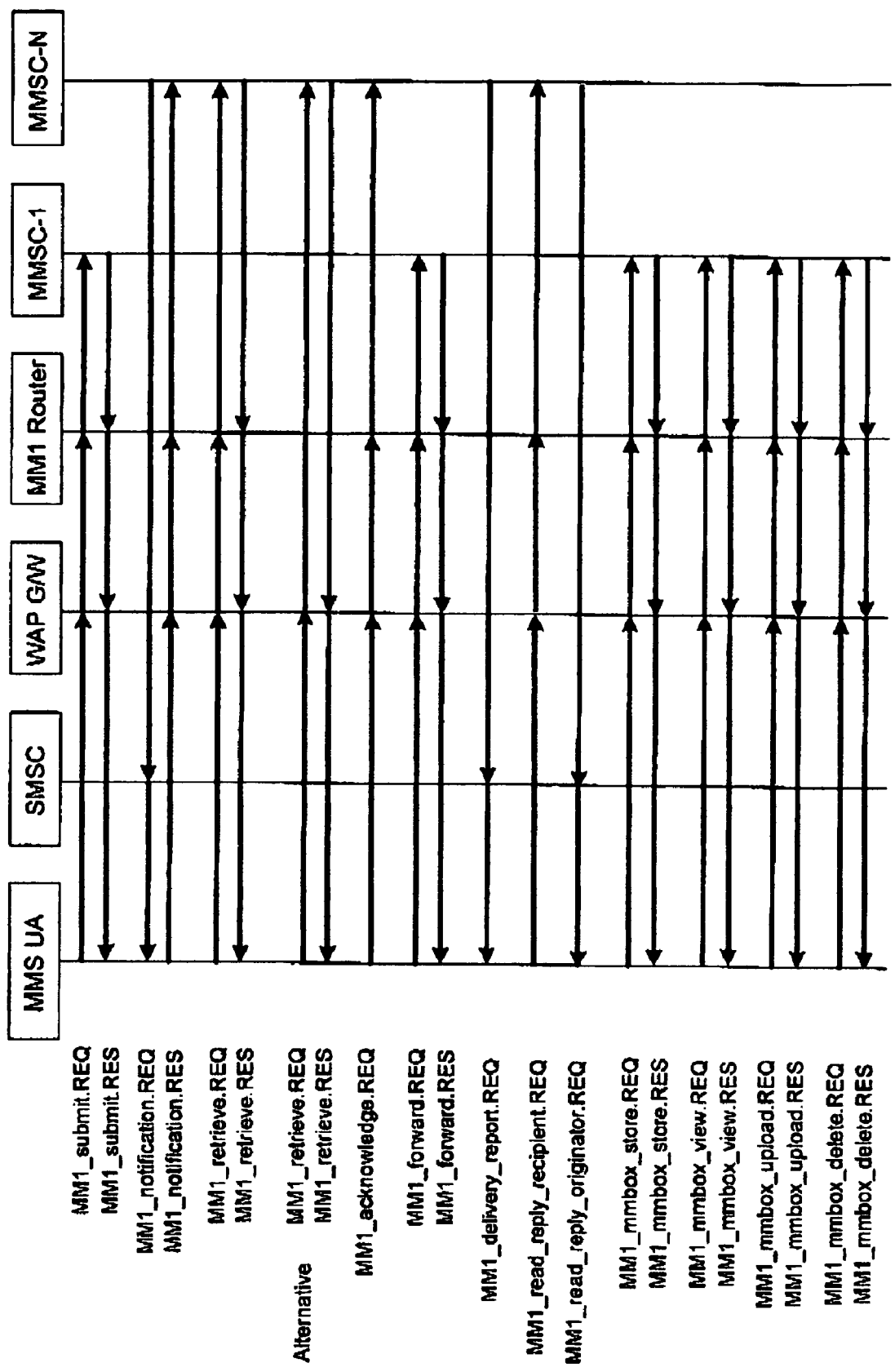
FIG. 8 represents a message sequence chart for a number of exemplary MM1 message sequences according to an exemplary embodiment of the present invention.

FIG. 8 represents a message sequence chart for a number of exemplary MM1 message sequences showing the flow of messages between the UA 100 (MMS UA), the SMSC 140, the WAP Gateway (WAP G/W) 130, the MM1 Router 200 and two MMSC 120 (MMSC-1 and MMSC-N) according to the exemplary embodiment represented in FIG. 4. Note that all unsolicited messages originating from the UA 110 are sent to the WAP Gateway 130 where they are forwarded onto the MMSC 120. Messages originating from the MMSC 120 in response to a message from the UA 110 are sent to the WAP Gateway 130 where they are forwarded onto the UA 110. Unsolicited messages originating from the MMSC 120 are sent to SMSC 140 where they are forwarded onto the UA 110.

In a further exemplary embodiment of the MM1 Router 200 according to the present invention, load-balancing and fault-tolerance based routing is provided. In an exemplary operating environment multiple MMSC 120 can exist that provide the same MMS service. Multiple MMSC 120 that provide the same service can, for example, provide greater service capacity by sharing the load (i.e. load-balancing) of message processing or can provide fault-tolerance by creating redundant message processing capacity. The MM1 Router 200 provides load-balancing message routing when a message is received from the UA 110 by applying a load distribution algorithm such as, for example, round robin, lowest processor occupancy, least recently served or other similar load distribution algorithms. Successive received messages are distributed amongst the multiple MMSC 120 providing the appropriate service thereby sharing the processing load between the multiple MMSC 120. The MM1 Router 200 provides fault-tolerance based routing when a message is received from the UA 110 by applying fault-tolerance algorithm such as, for example, active-standby pairing, load-share pairing, N+1 spared or other similar fault-tolerance algorithms.

In yet another exemplary embodiment of the MM1 Router 200 according to the present invention, service-responsibility based routing is provided. In an exemplary operating environment multiple MMSC 120 can exist that each provides a different MMS service. MMS services can be differentiated by service type such as, for example, P2P, A2P, MMBox or other similar service types or by specific service offering such as, for example, email server, streaming video, or other similar service offerings. Routing of messages received from the UA110, via the WAP Gateway 130, is based on a service or a service type identifier contained in the message. The service or service type identifier is used to determine to which of the MMSC 120 the message is to be sent.

In yet a further exemplary embodiment of the MM1 Router 200 according to the present invention, routing of received messages can be based on any one or more of the above describe message routing approaches. For example, in routing of a received message address based routing can be applied first followed by load-balancing and fault-tolerance based routing.

Figure 5:
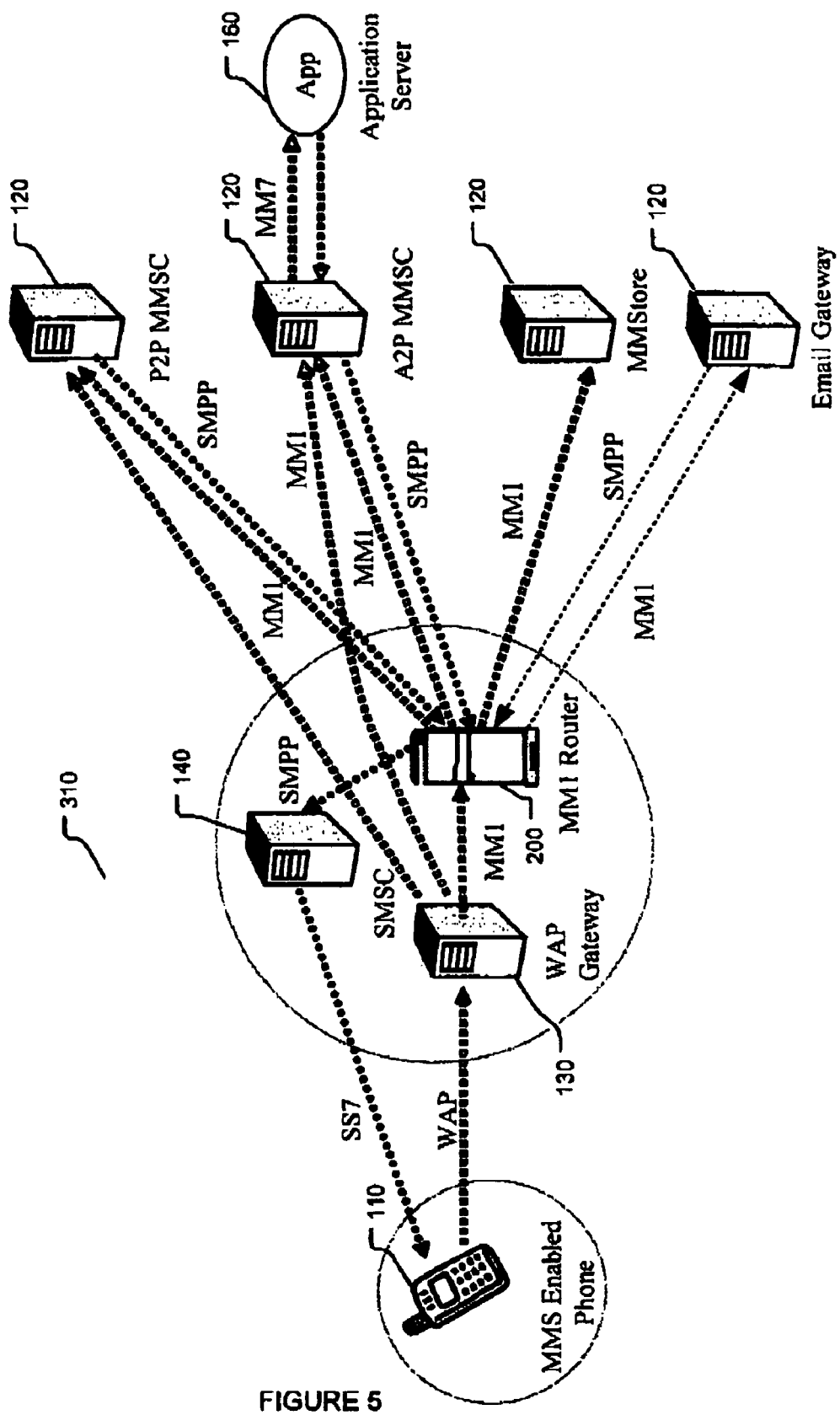
FIG. 5 is a schematic representation of another exemplary embodiment of an MM1 Router according to the present invention in an exemplary operating environment.

FIG. 5 is a schematic representation of another exemplary embodiment of an MM1 Router 200 according to the present invention in an exemplary operating environment 300 similar to that in FIG. 4 and described above. In the embodiment represented in FIG. 4 the MMSC 120 are connected to the SMSC 140 such that messages from the MMSC 120 to the UA 110 effectively by-pass the MM1 Router 200. In the embodiment represented in FIG. 5, the MMSC 120 are linked to the MM1 Router 200 such that messages from the MMSC 120 to the UA 110 are received by the MM1 Router 200 which then forwards the messages to the SMSC 140. As a result, in the embodiment represented in FIG. 5 all of the MMS messages sent from the UA 110 to the MMSC 120 and vise versa are seen (i.e. received and processed) by the MM1 Router 200.

In an alternative embodiment, some of the MMSC 120 can be connected to the SMSC 140 while others of the MMSC 120 can be connected to the MM1 Router 200 for message from the MMSC 120 to the UA 110 while remaining in the spirit and scope of the present invention.

Figure 6:
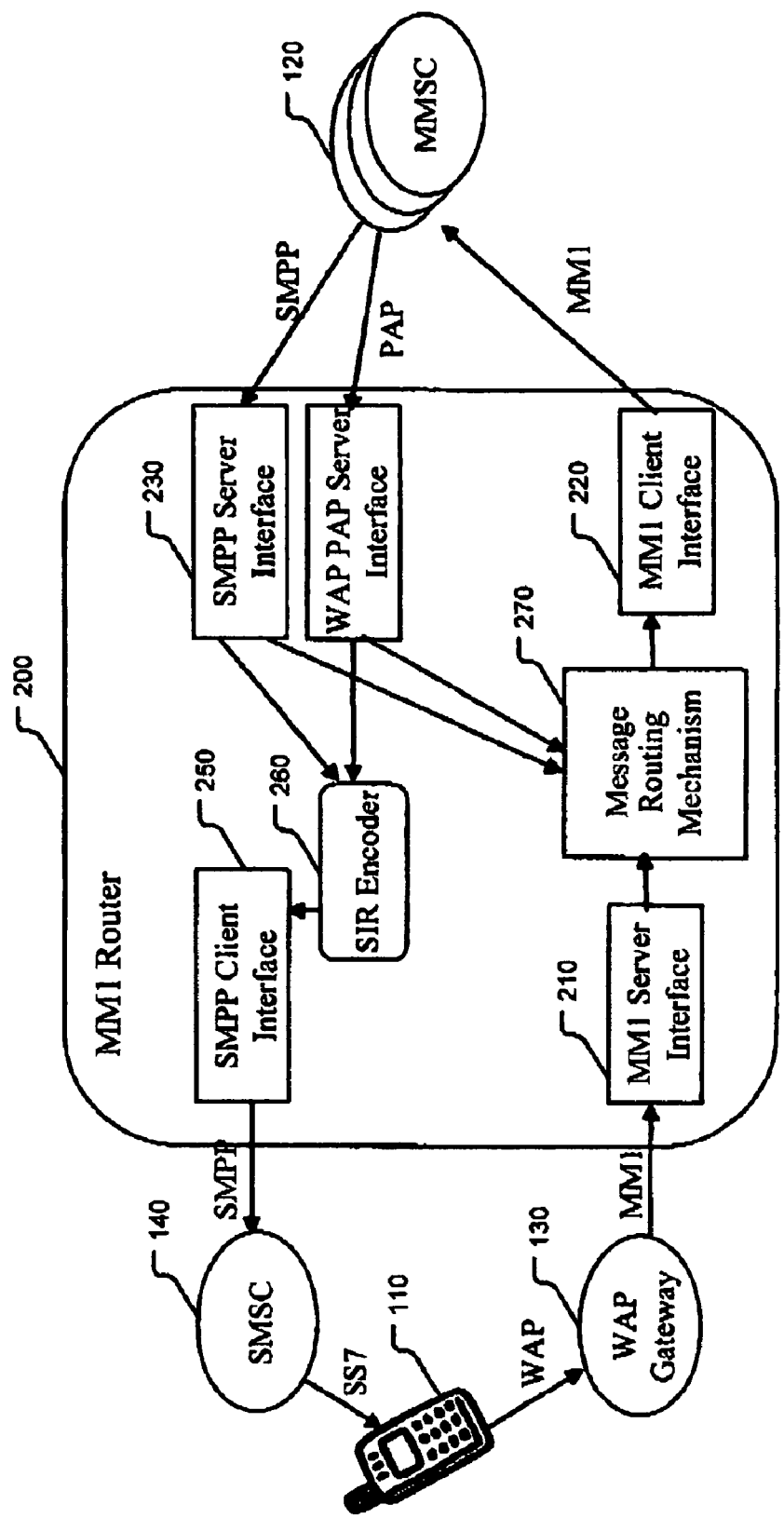
FIG. 6 is a schematic representation of an exemplary embodiment of a MM1 Router according to the present invention.

FIG. 6 is a schematic representation of an exemplary embodiment of a MM1 Router 200 according to the present invention. The MM1 Router 200 comprises an MM1 Server Interface 210, an MM1 Client Interface 220, a SMPP Server Interface 230, a WAP PAP Server Interface 240, a SMPP Client Interface 250, a Session Initiation Request (SIR) Encoder 260 and a Message Routing Mechanism 270. The UA 110 sends messages to the WAP Gateway 130 which are then sent in MM1 protocol t the MM1 Server interface 210. Messages received by the MM1 Server Interface 210 are sent to the Message Routing Mechanism 270. Determination of which of the plurality of MMSC 120 a message is sent to is made by the Message Routing Mechanism 270. The Message Routing Mechanism 270 applies one or more of the routing determination algorithms (i.e. address based, session based, load-balancing and fault-tolerance based, and service-responsibility based) described above. After determining which MMSC 120 the message is to be sent to, the Message Routing Mechanism sends the message to the MM1 Client Interface 220 which sends it, in MM1 protocol, to one of the plurality of MMSC 120.

Messages in SMPP protocol sent from one of the plurality of MMSC 120 are sent to the SMPP Server Interface 230. Messages received by the SMPP Server Interface 230 are sent to the SIR Encoder 260 and then on to the SMPP Client Interface 250. Messages in PAP protocol sent from the one of the plurality of MMSC 120 are sent to the WAP PAP Server Interface 240. Messages received by the WAP PAP Server Interface 240 are sent to the SIR Encoder 260. The SIR Encoder 260 encodes an Session Initiation Request (SIR) in the MMS Encapsulation format (according to Open Mobile Alliance, OMA-MMS-ENC, "Multimedia Messaging Service Encapsulation Protocol"). The message with the encoded SIR is passed on to the SMPP Client Interface 250. Messages received by the SMPP Client Interface 250 are sent in SMPP protocol to the SMSC 140 and then on to the UA 110. Information identifying MMS message sessions are derived from the messages received by the SMPP Server Interface 230 and the WAP PAP Server Interface 240. The session identifying information such as, for example, a session identifier or a message identifier is sent to and recorded in the Message Routing Mechanism 270. Session identifying information recorded in the Message Routing Mechanism 270 can be accessed when processing a message received from the WAP Gateway 130 in order to contribute to the routing of the message.

In an alternative embodiment of the MM1 Router 200 according to the present invention, the MM1 Router 200 is comprised of an MM1 Server Interface 210, an MM1 Client Interface 220 and a Message Routing Mechanism 270 that function similarly to as described for the embodiment represented in FIG. 6. This embodiment can preferably be used in a context 300 as represented in FIG. 4 in which the MMSC 120 are not connected to the MM1 Router 200 for message sent from the MMSC 120 to the UA 110.

Figure 7:
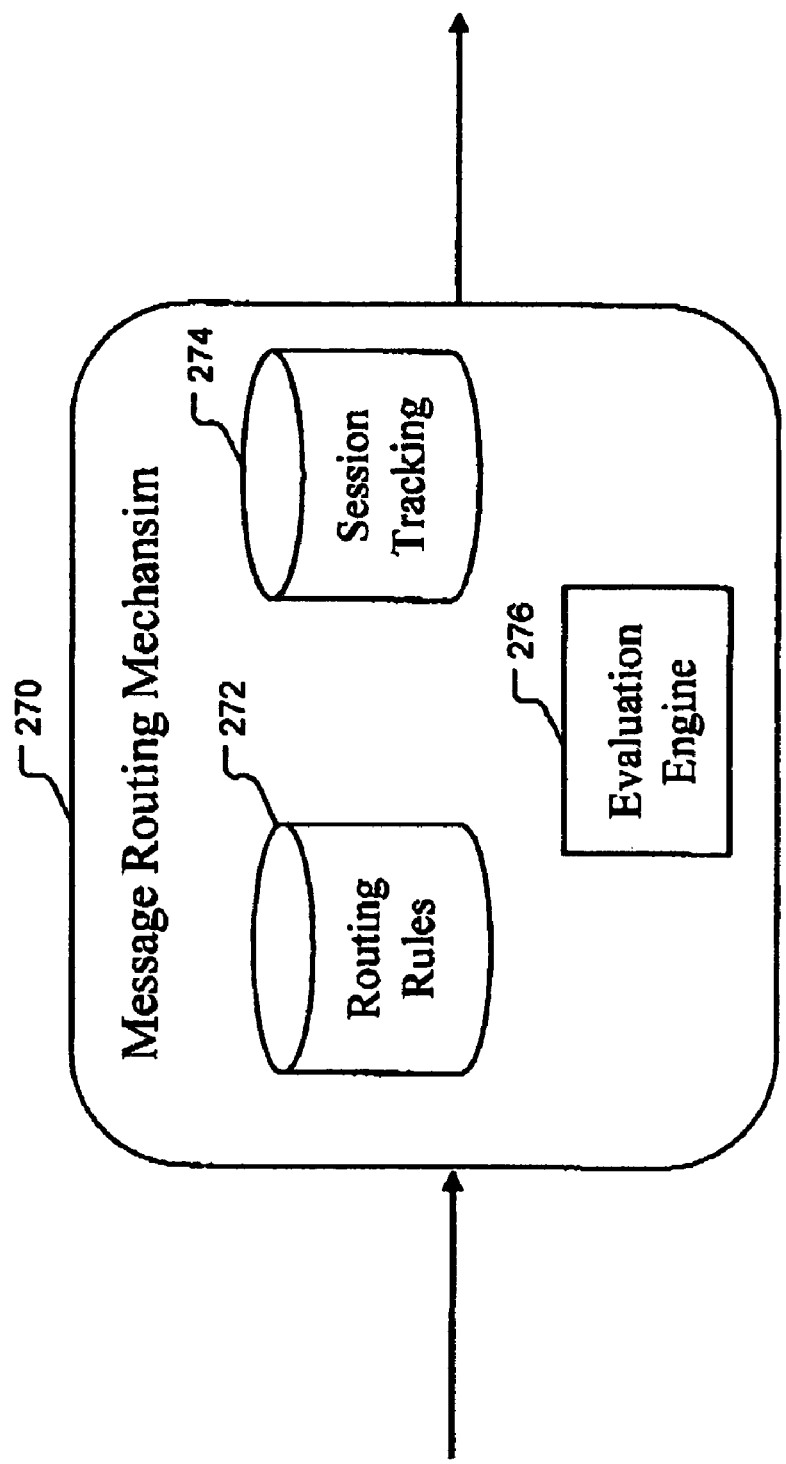
FIG. 7 is a schematic representation of an exemplary embodiment of the Message Routing Mechanism according to the present invention.

FIG. 7 is a schematic representation of an exemplary embodiment of the Message Routing Mechanism 270 according to the present invention. The Message Routing Mechanism 270 is comprised of a routing rules repository 272, a session tracking information repository 274 and an evaluation engine 276. The routing rules repository 272 contains information necessary for selecting and applying any of the routing determination algorithms described above. The session tracking information repository 274 contains session identifying information derived from the messages received by the SMPP Server Interface 230 and the WAP PAP Server Interface 240. The evaluation engine 276 selects and applies one or more of the routing algorithms, described above, using information obtained from the routing rules repository 272 and the session tracking information repository 274. In order to apply a routing algor the evaluation engine 276 can inspect various protocol data items contained in a message such as, for example, a destination address, a destination address type, a destination address domain, a shortcode, a country or area code, a sender address, a receiver address alias, a transaction identifier, a message identifier, a service type and a specific service identifier. In addition the evaluation engine 276 can apply pre-configured information such as, for example, MMSC 120 load sharing assignments, MMSC 120 service types and service assignments, MMSC 120 fault-tolerance assignments. The evaluation engine 276 can also apply message traffic history derived information such as, for example, MMSC 120 message history with respect to number of messages, order of sent messages, MMSC 120 occupancy, MMSC 120 responsiveness.

Having applied the one or more routing algorithm the evaluation engine 276 determines which MMSC 120 to route a message to. The evaluation engine 276 modifies the message by amending a destination address contained in the message to that of the MMSC 120 to which it has determined the message is to be routed.

Figure 9:
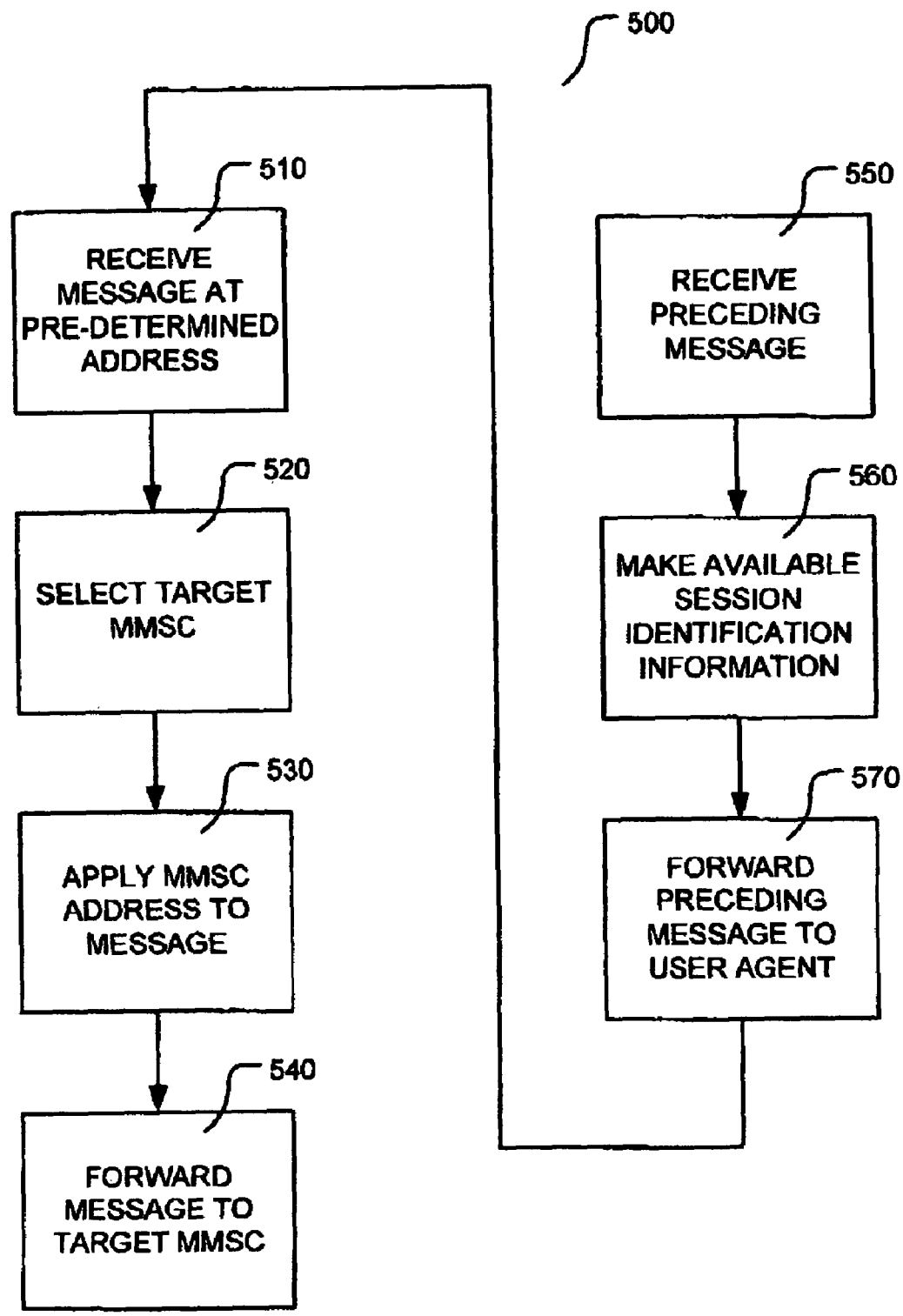
FIG. 9 is flow diagram representing the steps in a method according to the present invention.

FIG. 9 is flow diagram representing the steps in a method 500 for routing a multimedia message sent by a user agent to one of a plurality of multimedia message service centers, the user agent applying a pre-determined destination address to the multimedia message, according to the present invention. The method 500 can begin with a step 510 of receiving the multimedia message at the predetermined address. A next step 520 is selecting a target multimedia message service center for the plurality of multimedia message service centers. A step 530 of applying an address of the target multimedia message service center to the received multimedia message follows. This is followed by a step 540 of forwarding the received multimedia message responsive to the applied address of the target multimedia message service center. Alternative, when the multimedia message is sent in response to a preceding multimedia message sent from an originating multimedia message service center from the plurality of multimedia message service centers to the user agent, the method 500 can begin with a step 550 of receiving the preceding multimedia message. A step 560 of making available session identification information associated with the preceding multimedia message follows. This is followed by a step 570 of forwarding the preceding multimedia message to the user agent. The method 500 then continues from step 510 to step 540 as described above.

The method 500 according to the present invention can be implemented by a computer program product comprising computer readable program codes devices.

It will be apparent to one skilled in the art that numerous modifications and departures from the specific embodiments described herein may be made without departing from the spirit and scope of the present invention.

The invention claimed is:

1. A router, comprising:
   (a) a first server interface for receiving a multimedia message, sent from a user agent, based on a pre-determined destination address;
   (b) a message routing mechanism for:
      (i) selecting a target multimedia message service center, having an address, from a plurality of multimedia message service centers; and
      (ii) applying the address to the multimedia message received by the first server interface by replacing the pre-determined destination address;
      (iii) selecting the target multimedia message service center based on session identification information associated with the multimedia message, wherein the session identification information is a unique discriminator, for identifying one of the plurality of multimedia message service centers, incorporated in a component of the multimedia message and selected from a set comprising a transaction identifier, a message identifier and combinations thereof; and
   (c) a first client interface for forwarding the multimedia message to the applied address.

2. A router, comprising:
   (a) a first server interface for receiving a multimedia message, sent from a user agent, based on a pre-determined destination address;
   (b) a message routing mechanism for:
      (i) selecting a target multimedia message service center, having an address, from a plurality of multimedia message service centers; and
      (ii) applying the address to the multimedia message received by the first server interface by replacing the pre-determined destination address;
      (iii) wherein the message routing mechanism selects the target multimedia message service center using a basis selected from the set comprising session identification information associated with the multimedia message, and service identifying information contained in the multimedia message and combinations thereof, wherein the session identification information is a unique discriminator for identifying one of the plurality of multimedia message service centers, incorporated in a component of the multimedia message and selected from a set including a transaction identifier, a message identifier and combinations thereof; and, (c) a first client interface for forwarding the multimedia message to the applied address.

3. A method for routing a multimedia message sent by a user agent to one of a plurality of multimedia message service centers, the user agent applying a pre-determined destination address to the multimedia message, comprising the steps of:
   a) receiving the multimedia message, at the pre-determined destination address;
   b) selecting a target multimedia message service center from the plurality of multimedia message service centers;
   c) applying an address of the target multimedia message service center to the received multimedia message by replacing the pre-determined destination address; and
   d) forwarding the received multimedia message responsive to the applied address of the target multimedia message service center:
      wherein the selection of the target multimedia message service center is based on session identification information associated with the multimedia message, the session identification information is a unique discriminator for identifying one of the plurality of multimedia message service centers, incorporated in a component of the multimedia message and selected from a set comprising a transaction identifier, a message identifier and combinations thereof.

4. A method for routing a multimedia message sent by a user agent to one of a plurality of multimedia message service centers, the user agent applying a pre-determined destination address to the multimedia message, comprising the steps of:
   a) receiving the multimedia message, at the pre-determined destination address;
   b) selecting a target multimedia message service center from the plurality of multimedia message service centers;
   c) applying an address of the target multimedia message service center to the received multimedia message by replacing the pre-determined destination address; and
   d) forwarding the received multimedia message responsive to the applied address of the target multimedia message service center wherein selecting the target multimedia message service center uses a basis selected from a set comprising session identification information associated with the multimedia message, and service identifying information contained in the multimedia message and combinations thereof; and wherein the session identification information is a unique discriminator, for identifying one of the plurality of multimedia message service centers, incorporated in a component of the multimedia message and selected from a set comprising a transaction identifier, a message identifier and combinations thereof.

* * * * *

UNITED STATES PATENT AND TRADEMARK OFFICE
CERTIFICATE OF CORRECTION

PATENT NO. : 7,649,895 B2  Page 1 of 1
APPLICATION NO. : 10/747366
DATED : January 19, 2010
INVENTOR(S) : Kadar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1726 days.

Signed and Sealed this

Twenty-third Day of November, 2010

David J. Kappos
*Director of the United States Patent and Trademark Office*